United States Patent
Billinger et al.

(10) Patent No.: US 12,472,138 B2
(45) Date of Patent: Nov. 18, 2025

(54) COSMETIC O/W MASCARA COMPOSITIONS COMPRISING POLYURETHANE RESIN

(71) Applicant: THE BOOTS COMPANY PLC, Nottingham (GB)

(72) Inventors: Emma Billinger, Nottingham (GB); Paul James Tomlinson, Derby (GB)

(73) Assignee: THE BOOTS COMPANY PLC, Nottingham (GB)

( * ) Notice: Subject to any disclaimer, the term of this patent is extended or adjusted under 35 U.S.C. 154(b) by 771 days.

(21) Appl. No.: 17/423,738

(22) PCT Filed: Dec. 12, 2019

(86) PCT No.: PCT/EP2019/025454
§ 371 (c)(1),
(2) Date: Jul. 16, 2021

(87) PCT Pub. No.: WO2020/147915
PCT Pub. Date: Jul. 23, 2020

(65) Prior Publication Data
US 2022/0062155 A1    Mar. 3, 2022

(30) Foreign Application Priority Data
Jan. 16, 2019  (EP) .................................... 19020025

(51) Int. Cl.
| A61K 8/87 | (2006.01) |
| A61K 8/06 | (2006.01) |
| A61K 8/92 | (2006.01) |
| A61Q 1/10 | (2006.01) |

(52) U.S. Cl.
CPC ................ *A61K 8/87* (2013.01); *A61K 8/062* (2013.01); *A61K 8/922* (2013.01); *A61K 8/925* (2013.01); *A61Q 1/10* (2013.01); *A61K 2800/43* (2013.01); *A61K 2800/87* (2013.01); *A61K 2800/88* (2013.01); *A61K 2800/95* (2013.01)

(58) Field of Classification Search
None
See application file for complete search history.

(56) References Cited

U.S. PATENT DOCUMENTS

| 5,620,693 A | 4/1997 | Piot et al. |
| 5,747,013 A | 5/1998 | Mougin et al. |
| 6,264,933 B1 | 7/2001 | Bodelin et al. |
| 6,464,969 B2 | 10/2002 | De La Poterie et al. |
| 6,482,400 B1 | 11/2002 | Collin |
| 6,491,931 B1 | 12/2002 | Collin |
| 6,517,823 B1 | 2/2003 | Norman et al. |
| 6,835,399 B2 | 12/2004 | Collin |
| 6,946,123 B2 | 9/2005 | De La Poterie et al. |
| 6,991,782 B2 | 1/2006 | Kanji et al. |
| 7,867,504 B2 | 1/2011 | De La Poterie et al. |
| 7,993,632 B2 | 8/2011 | Jager Lezer et al. |
| 8,211,415 B2 | 7/2012 | Pays et al. |
| 8,992,899 B2 | 3/2015 | Patel et al. |
| 2002/0085986 A1* | 7/2002 | De La Poterie ......... A61K 8/87 424/70.11 |
| 2003/0118542 A1 | 6/2003 | Auguste et al. |
| 2004/0022752 A1 | 2/2004 | De La Poterie |
| 2004/0126401 A1 | 7/2004 | Collin |
| 2004/0180021 A1 | 9/2004 | De La Poterie |
| 2005/0180936 A1 | 8/2005 | Pays |

(Continued)

FOREIGN PATENT DOCUMENTS

| FR | 2818900 A1 | 7/2002 |
| FR | 2859100 A1 | 3/2005 |

(Continued)

OTHER PUBLICATIONS

Chinese Office Action and Search Report for Chinese Application No. 201980089245.7 issued Nov. 1, 2022.

(Continued)

*Primary Examiner* — Brian Gulledge
(74) *Attorney, Agent, or Firm* — MARSHALL, GERSTEIN & BORUN LLP

(57) ABSTRACT

According to the present invention there is provided a stable, fluid, tubing mascara composition in the form of an oil-in-water emulsion comprising: (i) at least 9% by weight of the total composition of one or more film-forming aliphatic polyurethane resins; and (ii) one or more waxes; wherein the ratio of total aliphatic polyurethane resin concentration to total wax concentration is between 0.70 and 0.92. The present invention also provides an assembly or kit for packaging and applying a mascara composition for coating eyelashes, comprising: (i) a device for packaging the mascara composition as defined above; and (ii) an applicator for the composition. The present invention also provides a method using the assembly or kit as defined above for building up layers of the mascara composition onto the eyelashes comprising: (i) applying the mascara composition to the applicator; (ii) moving the applicator so that the mascara composition is applied to the eyelashes from the roots of the eyelashes to the tips of the eyelashes; (iii) optionally repeating (ii) in order to apply an even coat of the mascara composition onto the eyelashes; and (iv) optionally repeating steps (i) to (iii), wherein subsequent reapplications of the mascara compositions are carried out whilst the mascara composition present on the eyelashes has not yet dried.

17 Claims, No Drawings

(56) References Cited

U.S. PATENT DOCUMENTS

| | | |
|---|---|---|
| 2007/0025943 A1 | 2/2007 | Patel |
| 2008/0014164 A1 | 1/2008 | Jacquier |
| 2009/0142289 A1* | 6/2009 | Arditty .................... A61Q 1/10 424/70.7 |
| 2009/0291056 A1 | 11/2009 | Castro et al. |
| 2013/0039874 A1 | 2/2013 | Li et al. |
| 2015/0174056 A1 | 6/2015 | Barba et al. |
| 2015/0283062 A1 | 10/2015 | Ilekti et al. |

FOREIGN PATENT DOCUMENTS

| | | |
|---|---|---|
| FR | 2920092 A1 | 2/2009 |
| WO | WO-2012158857 A1 | 11/2012 |

OTHER PUBLICATIONS

European Search Report for Application No. 19020025.3, dated Jul. 5, 2019.
George, "Tubing mascaras: The smudge-free formulas that dreams are made of", Glamour, Apr. 11, 2018.
International Application No. PCT/EP2019/025454, International Search Report and Written Opinion, mailed Mar. 11, 2020.
Patent Examination Report No. 1, New Zealand Patent Application No. 777276, dated Nov. 21, 2023.
United Arab Emirates Search Report for Application No. P6001193/2021.

* cited by examiner

COSMETIC O/W MASCARA COMPOSITIONS COMPRISING POLYURETHANE RESIN

CROSS REFERENCE TO RELATED APPLICATIONS

This application is the U.S. national phase of PCT Application No. PCT/EP2019/025454, filed Dec. 12, 2019, which claims priority to European Application No. 19020025.3, filed Jan. 16, 2019, the entire disclosures of which are hereby incorporated by reference in their entirety.

FIELD OF THE INVENTION

The present invention relates to novel stable fluid tubing mascara compositions that are buildable in order to provide a volumised cosmetic effect.

BACKGROUND TO THE INVENTION

Consumers are continuously demanding long-wear colour cosmetics, with "long-lasting" being the most frequently made claim within the colour cosmetic category in 2016 and 2017 according to Mintel. Consumers are increasingly wishing to use cosmetics that can last all day without re-application and can be worn in humid conditions or during exercise.

With respect to mascara cosmetics, traditional mascaras tend to lack the ability to sufficiently remain on eye lashes if subjected to external forces such as rubbing or water. Furthermore, these mascaras would often smudge on the user's face if the formulation became detached from the eyelashes, leaving an unflattering "panda-eye" look. Attempts to solve such problems have led to mascaras that do not provide the desired thickening effect or become so difficult to remove that the eye lashes are damaged after such formulations are removed.

Tubing mascaras solve the "panda-eye" problem discussed above by coming off in "tubes", i.e. cylindrical clumps, rather than smudging. This is achieved through using relatively high concentrations of film-forming polymers (such as aliphatic polyurethane resins) within the formulation. These tubing mascaras generally provide sweat-proof, humidity-proof long-wear as they are removable through the use of warm water.

However, as is discussed in the press (for example Abbersteen, Lucy "Tubing mascaras: What are they and should you be using one?", *Marie Claire*, 14 Mar. 2018), the common disadvantage of tubing mascaras is that they are very difficult to build up in layers in order to achieve a volumised look. Techniques discussed in the art in order to achieve a volumised look with a tubing mascara include using a side-ways application (see George, Jenn "Tubing mascaras: The smudge-free formulas that dreams are made of", *Glamour*, 11 Apr. 2018) but this in practice is difficult to carry out without forming clumps. Another technique involves using a pencil eyeliner in combination with the tubing mascara (see "L'Oréal Beauty Magazine "How to Use Tubing Mascara", retrieved from https://www.loreal-parisusa.com/beauty-magazine/makeup/eye-makeup/how-to-use-tubing-mascara.aspx, date accessed 13 Sep. 2018") but this involves the use of multiple products which is less convenient and this is also difficult to carry out in practice.

U.S. Pat. No. 8,992,899 relates to one-coat mascara compositions that are not buildable.

US2015283062, US2015174056, FR2920092, US2008014164, US2007025943 U.S. Pat. No. 8,211,415, US20050180936, U.S. Pat. Nos. 6,517,823, 6,491,931 and 6,482,400 all relate to mascara compositions that are not tubing.

FR2859100, U.S. Pat. No. 7,993,632, US2004180021, US2003118542, U.S. Pat. No. 6,991,782, FR2818900, U.S. Pat. No. 6,835,399, US2004022752, U.S. Pat. Nos. 6,946,123, 7,867,504, 6,464,969 and 6,264,933 all relate to mascara compositions in gel form rather than the emulsions of the present invention.

There remains a need for a means of providing a mascara that is both tubing (i.e. is removed with warm water and forms tubes rather than smudges upon removal) and is buildable in order to achieve a volumised look.

SUMMARY OF THE INVENTION

The inventors have surprisingly demonstrated that, through formulating an emulsion composition comprising high levels of film-forming polymer (such as aliphatic polyurethane resins) and a ratio of total aliphatic polyurethane resin concentration to total wax concentration of between 0.70 and 0.92, a balance can be struck between providing tubing long-wear and also providing a buildable volumising effect in a mascara composition.

According to the first aspect, the present invention provides a stable, fluid, tubing mascara composition in the form of an oil-in-water emulsion comprising: (i) at least 7% by weight of the total composition of one or more film-forming aliphatic polyurethane resins; and (ii) one or more waxes, wherein the ratio of total aliphatic polyurethane resin concentration to total wax concentration is between 0.70 and 0.92.

In one embodiment the one or more of the film-forming aliphatic polyurethane resins of the mascara composition comprises a polyether-polyurethane resin, preferably PPG-17/IPDI/DMPA copolymer. In one embodiment, the total film-forming aliphatic polyurethane resin concentration present in the mascara composition is at least 8%, preferably at least 9%, more preferably at least 10%, more preferably at least 11%, more preferably at least 12%, by weight of the total composition.

According to a further aspect, the present invention provides a stable, fluid, tubing mascara composition in the form of an oil-in-water emulsion comprising: (i) at least 9% by weight of the total composition of one or more film-forming aliphatic polyurethane resins; and (ii) one or more waxes, wherein the ratio of total aliphatic polyurethane resin concentration to total wax concentration is between 0.70 and 0.92.

In one embodiment the one or more of the film-forming aliphatic polyurethane resins of the mascara composition comprises a polyether-polyurethane resin, preferably PPG-17/IPDI/DMPA copolymer. In one embodiment, the total film-forming aliphatic polyurethane resin concentration present in the mascara composition is at least 10%, preferably at least 11%, more preferably at least 12%, by weight of the total composition.

In one embodiment the one or more waxes present in the mascara composition comprise petrolatum waxes such as paraffin wax, microcrystalline wax, in particular okerin wax, waxes of plant or animal origin such as carnauba wax, candelilla wax, beeswax, lanolin wax, Chinese insect waxes, rice wax, ouricury wax, esparto grass wax, sugarcane wax, Japan wax, sumach wax, hydrogenated jojoba oil, hydrogenated palm oil, mineral waxes such as Montan wax and ozokerite, polyethylene waxes such as PEG6000, waxes obtained by the Fischer-Tropsch synthesis, a $C_{20}$-$C_{40}$ alkyl hydroxystearyloxystearate, waxy copolymers, in particular the ethylene/vinyl acetate copolymer, and their esters, the waxes obtained by catalytic hydrogenation of animal or vegetable oils having linear or branched $C_8$-$C_{32}$ fatty chains, the waxes obtained by hydrogenation of olive oil esterified with stearyl alcohol, the waxes obtained by hydrogenation of castor oil esterified with cetyl alcohol, silicone waxes, such as alkyl or alkoxy dimethicones having from 16 to 45 carbon atoms, fluoro waxes or combinations thereof. In a preferred embodiment the one or more waxes comprise, paraffin wax, carnauba wax, candelilla wax, beeswax or combinations thereof. In one embodiment the total wax concentration present in the mascara composition is at least 14%, preferably at least 15%, by weight of the total composition. In one embodiment the total wax concentration present in the mascara composition is less than 25% by weight of the total composition.

In one embodiment, the mascara composition further comprises one or more emulsifiers. In a further preferred embodiment, the one or more emulsifiers comprise $C_{16}$-$C_{40}$, fatty acid soap-based systems or combinations thereof, preferably cetearyl alcohol, steareth-21, $C_{20}$-$C_{40}$ pareth-40, steareth-2, glyceryl stearate, glyceryl behenate, cetyl alcohol, myristyl alcohol, stearyl alcohol, potassium cetyl phosphate, ceteareth 20, steareth 20, PEG 200 glyceryl stearate or combinations thereof. The skilled person would understand that some of the emulsifiers above require neutralisation using, for example, triethanolamine, tromethamine or aminomethyl propanediol. In one embodiment, the total emulsifier concentration present in the mascara composition is less than 6%, preferably less than 5%, more preferably less than 4%, more preferably less than 3.5%, by weight of the total composition.

In one embodiment, the mascara composition further comprises one or more volumising powders or fillers. In a further preferred embodiment the one or more volumising powders or fillers comprise HDI/trimethylol hexyllactone crosspolymer, polyamide powders, nylon powders for example nylon 6, rayon, silica, treated silica, zinc stearate, mica, kaolin, polyethylene powder, PTFE powders, starch, boron nitride, copolymer microspheres, silicone resin microbeads, talc, mica, synthetic fluorphlogopite and combinations thereof. In a further preferred embodiment the one or more volumising powders or fillers comprise HDI/trimethylol hexyllactone crosspolymer, polyamide powders for example Orgasol®, nylon powders for example nylon 6, rayon, silica, treated silica, zinc stearate, mica, kaolin, polyethylene powder, PTFE powders for example Teflon®, starch, boron nitride, copolymer microspheres for example Expancel® and Polytrap®, silicone resin microbeads for example Tospearl®, talc, mica, synthetic fluorphlogopite and combinations thereof. In one embodiment, the total volumising powder/filler concentration is between 2% and 20%, preferably between 5% and 15%, more preferably between 8% and 12%, by weight of the total composition.

In one embodiment, the ratio of total aliphatic polyurethane resin concentration to total wax concentration is between 0.72 and 0.92, between 0.74 and 0.92, between 0.76 and 0.92, between 0.78 and 0.92, between 0.79 and 0.92, between 0.70 and 0.90, between 0.70 and 0.88, between 0.70 and 0.86, between 0.70 and 0.84, between 0.70 and 0.82, between 0.70 and 0.81, between 0.70 and 0.80, between 0.72 and 0.88, between 0.74 and 0.84, between 0.76 and 0.82 or between 0.78 and 0.80.

In one embodiment, the mascara composition further comprises a water-soluble polymer such as gums (for example xanthan gum), dextrin, starch, proteins (for example gelatin and albumin), hydroxyethylcellulose, methylcellulose, ethylcellulose, carboxymethyl cellulose, methyl starch, carboxymethyl starch, soluble starch, polyvinyl alcohol, polyvinylmethylether, sodium polyacrylate, polyacrylate crosspolymer, polyacrylic acid, bentonite, laponite, non-dispersed silicon, magnesium aluminium silicate or a combination thereof.

According to a further aspect, the present invention provides an assembly or kit for packaging and applying a mascara composition for coating eyelashes, comprising: (i) a device for packaging the mascara composition as defined above; and (ii) an applicator for the composition.

According to a further aspect, the present invention provides a method of using the assembly or kit as defined above for building up layers of the mascara composition onto the eyelashes comprising: (i) applying the mascara composition to the applicator; (ii) moving the applicator so that the mascara composition is applied to the eyelashes from the roots of the eyelashes to the tips of the eyelashes; (iii) optionally repeating (ii) in order to apply an even coat of the mascara composition onto the eyelashes; and (iv) optionally repeating steps (i) to (iii), wherein subsequent reapplications of the mascara compositions are carried out whilst the mascara composition present on the eyelashes has not yet dried.

DETAILED DESCRIPTION OF THE INVENTION

Mascara

The term "mascara" is understood to mean a composition intended to be applied to keratinous fibres (in particular eyelashes): it can be a composition for making up the keratinous fibres, a base for making up keratinous fibres, a composition to be applied to mascara, also referred to as top coat, or else a composition for the cosmetic treatment of keratinous fibres. The mascara is more particularly intended for keratinous fibres of human beings but also for false eyelashes. The application of mascara is targeted in particular at increasing the volume of the eyelashes and consequently at increasing the intensity of the gaze. Numerous thickening or volumising mascaras exist to do this, the principle of which consists in depositing the maximum amount of material onto the eyelashes so as to obtain this volumising (or loading) effect. It is in particular through the amount of solid particles (especially the waxes, which make it possible to structure the composition) that the desired application specificities for the compositions can be adjusted, such as, for example, their fluidity or consistency, and also their thickening power (also known as the loading or make-up power).

Fluid

The term "fluid" is understood to mean, according to the invention, a composition which flows under its own weight at ambient temperature, as opposed to a "solid" composition (such as a mascara cake).

Stable Oil-In-Water Emulsion

The term "emulsion", according to the IUPAC definition, is a fluid system in which liquid droplets are dispersed in a liquid. The liquid that forms the droplets (also known as the dispersed phase) and the liquid that the droplets are dispersed within (also known as the continuous phase) are immiscible. In the context of the present invention, the mascara is in the form of an oil-in-water emulsion, which means that the oil forms the dispersed phase and the aqueous phase, comprising water, forms the continuous phase.

Whilst emulsions and gels are both colloidal (where one substance of microscopically dispersed insoluble particles is suspended throughout another substance), importantly gels are different in that they comprise a liquid dispersed phase within a solid phase formed of a cross-linked polymeric network. Gel compositions do not fall within the scope of the present invention.

By "stable", it is understood that the mascara composition will remain in emulsion form (i.e. will not separate into two phases) from the point at which the mascara composition enters the final packaging until the point at which the last of the composition is used by the consumer (assuming that there are not any unusual delays from filling to the point at which the product is purchased by a consumer and assuming that the consumer does not neglect the mascara for an unusual period of time). Thus, "stable emulsions" are considered to encompass mascara compositions that remain in emulsion form for a period of at least three years at ambient room temperature.

Tubing Mascara

The mascara compositions of the present invention are tubing. "Tubing" mascaras are a specific form of long-wear, extreme-wear, sweat-proof, tear-proof, humidity-proof or long-lasting mascara where the mascara is not only resistant against sweating, tears, humidity and mechanical friction, but can also be easily removed through the use of warm water. Furthermore, tubing mascaras, upon application of warm water, do not detach from the lash in liquid form that can smudge the surrounding skin but instead comes off in tubular clumps (hence the name).

Tubing mascaras have several advantages over traditional long-wear mascaras: (1) they do not require the use of a make-up remover in order to remove, which may sting the eye and is useful when make-up remover is not to hand; (2) they do not require a lot of mechanical force in order to remove, so the removal of the mascara is less likely to lead to the removal of eyelashes also; and (3) if, for some reason, the tubing mascara formulation does come off prematurely, the mascara will come off in the form of clumps that can be easily brushed away rather than in a liquid form that can smudge the surrounding skin, which can be an unpleasant sight.

Tubing mascaras work by drying shortly after application on the eyelashes and in doing so forming a polymer tubular film around each eyelash or a group of eyelashes. This polymer allows for this film to be resistant to cold water but also easily removed with warm water.

A film-forming aliphatic polyurethane resin is essential with respect to the mascara compositions of the present invention in order to obtain this tubing effect. These resins will typically form colloidally dispersed particles of the polyurethane polymer when placed in an aqueous environment. The polyurethane polymer may be either a polyester-polyurethane co-polymer or a polyether-polyurethane co-polymer. The polyether-polyurethane polymer is the reaction product of a predominantly aliphatic polyisocyanate component and a polyether polyol component. As used herein, the term "predominantly aliphatic" means that at least 70 weight percent (wt. %) of the polyisocyanate component is an aliphatic polyisocyanate, in which all of the isocyanate groups are directly bonded to aliphatic or cycloaliphatic groups, irrespective of whether aromatic groups are also present. More preferably, the amount of aliphatic polyisocyanate is at least 85 wt. %, and most preferably, 100 wt. %, of the polyisocyanate component. Examples of suitable aliphatic polyisocyanates include ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetramethylxylene diisocyanate (p-TMXDI) and its meta isomer (m-TMXDI), hydrogenated 2,4-toluene diisocyanate, and 1-isocyanto-1-methyl-3(4)-isocyanatomethyl cyclohexane (IMCI). Mixtures of aliphatic polyisocyanates can be used. Suitable polyether polyols include products obtained by the polymerization of a cyclic oxide or by the addition of one or more such oxides to polyfunctional initiators. Such polymerized cyclic oxides include, for example, ethylene oxide, propylene oxide and tetrahydrofuran. Such polyfunctional initiators having oxides added include, for example, water, ethylene glycol, propylene glycol, diethylene glycol, cyclohexane dimethanol, glycerol, trimethylopropane, pentaerythritol and bisphenols.

Suitable polyethers include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Commercially available polyether-polyurethanes useful in the present invention include those sold under the trade names AVALURE UR-450® (PPG-17/IPDI/DMPA copolymer), SANCURE 878® (polyester-polyurethane copolymer) and SANCURE 861® (polyester-polyurethane copolymer) by Lubrizol, and NEOREZ R-551® (aliphatic polyester polyurethane) by DSM.

The polyester-polyurethane polymer is the reaction product of a predominantly aliphatic polyisocyanate component and a polyester polyol component. Useful aliphatic polyisocyanates are described above. Polyester polyols that may be used in the polyester polyol component include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, glycerol, trimethylolpropane or pentaerythritol, or mixtures thereof. Also included are polycarboxylic acids, especially dicarboxylic acids, and ester-forming derivatives thereof. Examples include succinic, glutaric and adipic acids or their methyl esters, phthalic anhydride and dimethyl terephthalate. Polyesters obtained by the polymerisation of lactones, for example caprolactone, in conjunction with a polyol may also be used. Commercially available polyester-polyurethanes useful in the present invention include those sold under the trade names AVALURE UR-425® (polyurethane-2) and AVALURE UR-405® (polyurethane-2) by Lubrizol, and NEOREZ R-989® (aliphatic polyurethane) by DSM.

The concentration of the film-forming aliphatic polyurethane resin present in the mascara composition is at least 7% by weight of the total composition. In one embodiment, the concentration of the film-forming aliphatic polyurethane resin present in the mascara composition, is at least 8% by weight of the total composition. In a further embodiment, the concentration of the film-forming aliphatic polyurethane resin present in the mascara composition, is at least 9% by weight of the total composition. In a further embodiment, the concentration of the film-forming aliphatic polyurethane resin present in the mascara composition, is at least 10% by weight of the total composition. In a further embodiment, the concentration of the film-forming aliphatic polyurethane resin present in the mascara composition, is at least 11% by weight of the total composition. In a further embodiment, the concentration of the film-forming aliphatic polyurethane resin present in the mascara composition, is at least 12% by weight of the total composition.

Wax

The term "wax" is an organic compound that is a hydrophobic, malleable solid at or near ambient temperatures. As is known in the art, waxes are used within mascara compositions in order to provide a volumising look through providing structure.

In one embodiment the one or more waxes present in the mascara composition comprise petrolatum waxes such as paraffin wax, microcrystalline wax, in particular okerin wax, waxes of plant or animal origin such as carnauba wax, candelilla wax, beeswax, lanolin wax, Chinese insect waxes, rice wax, ouricury wax, esparto grass wax, sugarcane wax, Japan wax, sumach wax, hydrogenated jojoba oil, hydrogenated palm oil, mineral waxes such as Montan wax and ozokerite, polyethylene waxes such as PEG6000, waxes obtained by the Fischer-Tropsch synthesis, a $C_{20}$-$C_{40}$ alkyl hydroxystearyloxystearate, waxy copolymers, in particular the ethylene/vinyl acetate copolymer, and their esters, the waxes obtained by catalytic hydrogenation of animal or vegetable oils having linear or branched $C_8$-$C_{32}$ fatty chains, the waxes obtained by hydrogenation of olive oil esterified with stearyl alcohol, the waxes obtained by hydrogenation of castor oil esterified with cetyl alcohol, silicone waxes, such as alkyl or alkoxy dimethicones having from 16 to 45 carbon atoms, fluoro waxes or combinations thereof. In a preferred embodiment, the one or more waxes comprise paraffin wax, carnauba wax, candelilla wax, beeswax or combinations thereof.

In one embodiment, the total wax concentration present in the mascara composition is at least 14%, by weight of the total composition. In a further embodiment, the total wax concentration present in the mascara composition is at least 15%, by weight of the total composition. In one embodiment the total wax concentration present in the mascara composition is less than 25%.

Paraffin wax (also known as hard paraffin) is known in the art to be particularly effective in providing a buildable, volumising effect in mascara. This is due to its large crystalline structure that helps to impart hardness and structure to the product. In one embodiment, paraffin wax forms between 1% and 100% of the total waxes within the mascara composition (100% being where the wax within the mascara composition is exclusively paraffin wax). In a further embodiment, paraffin wax forms between 2% and 80% of the total waxes within the mascara composition. In a further embodiment, paraffin wax forms between 3% and 60% of the total waxes within the mascara composition. In a further embodiment, paraffin wax forms between 4% and 40% of the total waxes within the mascara composition. In a further embodiment, paraffin wax forms between 5% and 20% of the total waxes within the mascara composition. In a further embodiment, paraffin wax forms between 7% and 15% of the total waxes within the mascara composition. In a further embodiment, paraffin wax forms between 8% and 12% of the total waxes within the mascara composition.

Total Aliphatic Polyurethane Resin Concentration to Total Wax Concentration Ratio This ratio is determined by dividing the concentration of all the aliphatic polyurethane resins present within a composition combined with the concentration of all of the waxes present within the composition.

It is understood in the art that there is a conflict between mascaras that are able to achieve tubing properties and mascaras that are able to achieve a buildable, volumising look. It has surprisingly been found that a mascara with both tubing properties and volumising properties can be achieved through using a high concentration of film-forming polymer (such as an aliphatic polyurethane resin) and through achieving a total aliphatic polyurethane resin concentration to total wax concentration ratio of between 0.70 and 0.92.

In one embodiment, the total aliphatic polyurethane resin concentration to total wax concentration ratio is between 0.72 and 0.92. In a further embodiment, the total aliphatic polyurethane resin concentration to total wax concentration ratio is between 0.74 and 0.92. In a further embodiment, the total aliphatic polyurethane resin concentration to total wax concentration ratio is between 0.76 and 0.92. In a further embodiment, the total aliphatic polyurethane resin concentration to total wax concentration ratio is between 0.78 and 0.92. In a further embodiment, the total aliphatic polyurethane resin concentration to total wax concentration ratio is between 0.79 and 0.92. In a further embodiment, the total aliphatic polyurethane resin concentration to total wax concentration ratio is between 0.70 and 0.90. In a further embodiment, the total aliphatic polyurethane resin concentration to total wax concentration ratio is between 0.70 and 0.88. In a further embodiment, the total aliphatic polyurethane resin concentration to total wax concentration ratio is between 0.70 and 0.86. In a further embodiment, the total aliphatic polyurethane resin concentration to total wax concentration ratio is between 0.70 and 0.84. In a further embodiment, the total aliphatic polyurethane resin concentration to total wax concentration ratio is between 0.70 and 0.82. In a further embodiment, the total aliphatic polyurethane resin concentration to total wax concentration ratio is between 0.70 and 0.81. In a further embodiment, the total aliphatic polyurethane resin concentration to total wax concentration ratio is between 0.70 and 0.80. In a further embodiment, the total aliphatic polyurethane resin concentration to total wax concentration ratio is between 0.72 and 0.88. In a further embodiment, the total aliphatic polyurethane resin concentration to total wax concentration ratio is between 0.74 and 0.84. In a further embodiment, the total aliphatic polyurethane resin concentration to total wax concentration ratio is between 0.76 and 0.82. In a further embodiment, the total aliphatic polyurethane resin concentration to total wax concentration ratio is between 0.78 and 0.80.

Emulsifier

In one embodiment, the mascara composition further comprises one or more emulsifiers. The term "emulsifier" (also known as an emulgent) is a substance that stabilizes an emulsion by increasing its kinetic stability. It is understood that emulsifiers encompass surfactants (or surface-active agents) and solubilising agents. Emulsifiers are compounds that typically have a polar or hydrophilic (i.e. water-soluble) part and a non-polar (i.e. hydrophobic or lipophilic) part. In the context of the present invention, emulsifiers cover compounds that increase steric hindrance and so support emulsion stability even if they are not active at the water-oil interface.

In the context of the present invention, emulsifiers commonly used in mascaras include fatty acids and fatty alcohols, such as steareth 20, cetearyl alcohol, glyceryl stearate, glyceryl behenate, cetyl alcohol, myristyl alcohol, stearyl alcohol, cetyl phosphate, ceteareth 20, steareth 21, PEG 200 glyceryl stearate, potassium cetyl phosphate, stearic acid and combinations thereof. Preferably the emulsifiers are a combination of steareth 20 and cetearyl alcohol.

In one embodiment, where emulsifier is present, the total emulsifier concentration present in the mascara composition is less than 6%, by weight of the total composition. In a further embodiment, where emulsifier is present, the total emulsifier concentration present in the mascara composition, is less than 5%, by weight of the total composition. In a further embodiment, where emulsifier is present, the total emulsifier concentration present in the mascara composition, is less than 4%, by weight of the total composition. In a further embodiment, where emulsifier is present, the total emulsifier concentration present in the mascara composition, is less than 3.5%, by weight of the total composition.

Beeswax, in the context of the present invention, is considered to be a wax but not an emulsifier in itself. As is readily known in the art, beeswax comprises esters that may have an emulsifier effect when combined with a base such as sodium borate, but without this base an emulsifier effect is not possible.

Pigment

The mascara composition of the present invention may further comprise one or more pigments. The pigment may be organic or inorganic. Preferably the pigment is inorganic.

When organic, the pigment may be carbon black (D&C Black No2), an azo compound, xanthene, quinone or a lake pigment.

An azo compound is known in the art and relates to a compound having a divalent N=N— between two carbon atoms.

A lake pigment is known in the art and may be manufactured by precipitating a dye with an inert binder, or mordant, usually a metallic salt. Examples of a lake pigment include aluminium lakes, strontium lakes, or barium lakes.

When organic, the pigment is preferably carbon black.

The pigment may be surface treated, often with alkyl silanes, to improve dispersion in a hydrophobic media. The most common pigment surface treatment is triethoxycaprylylsilane. However, it is known in the art that surface-treatment provides little benefit when present in the water phase, which is typically the case with the present compositions.

When inorganic, the pigment may be iron oxide (such as black, yellow and red iron oxides), titanium dioxide, zinc oxide, potassium ferricyanide K33Fe(CN)6, potassium ferrocyanide K4Fe(CN)6·3H2O, potassium ferrocyanide dehydrate, an oxide of, zinc, zirconium and/or cerium, chromium oxide green, chromium hydroxide green, manganese violet or ferric ferrocyanide. When inorganic, the pigment is preferably iron oxide.

The pigment may be black, russet, umber, ultramarine, carmine, green or violet in colour. A mixture of these colours may be used in order to obtain the desired mascara colour.

In one embodiment, where the composition does comprise one or more pigments, these are present at a concentration of between 0.1% and 10% by weight of the total composition. In a further embodiment the composition comprises one or more pigments at a concentration of between 2% and 8% by weight of the total composition. In a further embodiment the composition comprises one or more pigments at a concentration of between 3% and 5% by weight of the total composition.

Volumising Powders/Fillers

The mascara composition of the present invention further may comprise one or more volumising powders or fillers. These powders and fillers can further improve the buildable, volumising effect of the mascara composition. The one or more volumising powders or fillers may include HDI/trimethylol hexyllactone crosspolymer, polyamide powders, nylon powders for example nylon 6, rayon, silica, treated silica, zinc stearate, mica, kaolin, polyethylene powder, PTFE powders, starch, boron nitride, copolymer microspheres, silicone resin microbeads, talc, mica, synthetic fluorphlogopite and combinations thereof. The one or more volumising powders or fillers may include HDI/trimethylol hexyllactone crosspolymer, polyamide powders for example Orgasol®, nylon powders for example nylon 6, rayon, silica, treated silica, zinc stearate, mica, kaolin, polyethylene powder, PTFE powders for example Teflon®, starch, boron nitride, copolymer microspheres for example Expancel® and Polytrap®, silicone resin microbeads for example Tospearl®, talc, mica, synthetic fluorphlogopite and combinations thereof.

In one embodiment, where one or more volumising powders or fillers are present, the composition comprises one or more volumising powders or fillers at a concentration of between 2% and 20%, by weight of the total composition. In a further embodiment, the composition comprises one or more volumising powders or fillers at a concentration of between 5% and 15%, by weight of the total composition. In a further embodiment, the composition comprises one or more volumising powders or fillers at a concentration of between 8% and 12%, by weight of the total composition.

Other Excipients

The mascara composition of the present invention may further comprise ingredients that are commonly used in mascara formulation.

The mascara composition may further comprise one or more water-soluble polymers, as these polymers can further aid the stabilization of the mascara emulsion. The water-soluble polymers may include gums (for example xanthan gum), dextrin, starch, proteins (for example gelatin and albumin), hydroxyethylcellulose, methylcellulose, ethylcellulose, carboxymethyl cellulose, methyl starch, carboxymethyl starch, soluble starch, polyvinyl alcohol, polyvinylmethylether, sodium polyacrylate, polyacrylate crosspolymer, polyacrylic acid, bentonite, laponite, non-dispersed silicon, magnesium aluminium silicate or a combination thereof. When a water-soluble polymer is present, the concentration of the water-soluble polymer within the mascara composition may be between 0.05% and 2%, between 0.1% and 1% or between 0.2% and 0.5%, by weight of the total composition.

The mascara composition may further comprise one or more preservatives and/or potentiators in order to ensure that the product remains free from pathogenic concentrations of micro-organisms throughout the use of the product. The preservatives and/or potentiators may include phenoxyethanol (phenoxetol), caprylyl glycol, ethylhexyl glycerin, pentylene glycol, 1,2 hexanediol, disodium/trisodium EDTA, sodium dehydroacetic acid and combinations thereof. When the preservatives and/or potentiators are present, the concentration of the preservatives and/or potentiators within the mascara composition may be between 0.1% and 3%, between 0.2% and 2% or between 0.5% and 1.5%, by weight of the total composition.

The mascara composition may further comprise one or more humectants in order to moisturise the hairs of the eyelid. The humectants may include butylene glycol and/or propanediol. When one or more humectants are present, the concentration of the one or more humectants within the mascara composition may be between 0.1% and 20%, between 1% and 10%, between 2% and 8% or between 4% and 6%.

The mascara may further comprise vitamin and/or mineral supplements, such as panthenol.

Packaging

The present invention also provides an assembly or kit for packaging and applying a mascara composition for coating eyelashes, comprising (i) a device for packaging the mascara composition as defined above; and (ii) an applicator for the composition. It is often common with mascara packaging that the applicator is integral with a grasping member forming a cap for the said packaging device. In other words, the said applicator can be mounted in a removable position on the said device between a closed position and an open position of a dispensing aperture of the device for packaging the said composition.

The skilled person would understand that there is a wide range of different applicators (also known as wands) available (from combs, triangles, curved, ball, cone, inverted cone, rectangle, bubble, skinny, wide, spiral, hourglass shapes, and either with plastic bristles or fabric bristles). The skilled person would be able to select the applicator most suitable for the mascara composition defined above. In one embodiment, the applicator is designed to hold a relatively large amount of mascara composition, as this is beneficial for creating a buildable, volumised look.

Method of Use

The present invention also provides a method of using the assembly or kit as defined above for building up layers of the mascara composition onto the eyelashes comprising (i) applying the mascara composition to the applicator; (ii) moving the applicator so that the mascara composition is applied to the eyelashes from the roots of the eyelashes to the tips of the eyelashes; (iii) optionally repeating (ii) in order to apply an even coat of the mascara composition onto the eyelashes; and (iv) optionally repeating steps (i) to (iii), wherein subsequent reapplications of the mascara compositions are carried out whilst the mascara composition present on the eyelashes has not yet dried.

Preferably, during step (ii) above, a minimal amount of side-ways motion is applied when moving the bristles of the applicator through the eyelashes. As discussed in the background, whilst the side-ways motion can be effective for achieving a volumising look using tubing mascaras in the art, this in practice is difficult to carry out without forming clumps, and a consumer would prefer not to use such a technique.

The skilled person will understand that optional features of one embodiment or aspect of the invention may be applicable, where appropriate, to other embodiments or aspects of the invention.

EXAMPLES

Example 1—Mascara Formulations

Three comparative mascara formulations (CE1, CE2 and CE3) and one inventive mascara formulation (IE) were batch manufactured. The key components of these formulations are presented in Table 1 below:

TABLE 1

| Material Name | Concentration (% w/w) | | | |
| --- | --- | --- | --- | --- |
| | CE1 | CE2 | CE3 | IE |
| PPG-17/IPDI/DMPA Copolymer (Avalure ™ UR 450 Polymer by Lubrizol) | 12.54 | 12.54 | 12.54 | 12.54 |
| Black iron oxide C33-7001 (SunPURO ® by Sun Chemical) | 4.00 | 4.00 | 4.00 | 4.00 |
| Cetearyl alcohol | 2.64 | 2.64 | 3.17 | 2.64 |
| Steareth-21 (Brij ™ S721 from Croda Inc.) | 0.66 | 0.66 | 0.79 | 0.66 |

TABLE 1-continued

| Material Name | Concentration (% w/w) | | | |
| --- | --- | --- | --- | --- |
| | CE1 | CE2 | CE3 | IE |
| Sequestrene tetrasodium | 0.05 | 0.05 | 0.05 | 0.05 |
| Hydroxyethylcellulose (Natrosol ™ 250 HHR by Ashland) | 0.20 | 0.20 | 0.20 | 0.20 |
| Xanthan gum (Keltrol ® RD by CP Kelco) | 0.10 | 0.10 | 0.10 | 0.10 |
| Phenoxetol | 0.60 | 0.60 | 0.60 | 0.60 |
| Capryly glycol and ethylhexylglycerin | 0.30 | 0.30 | 0.30 | 0.30 |
| Ethyl hydroxybenzoate | 0.10 | 0.10 | 0.10 | 0.10 |
| Methyl Hydroxybenzonate BP | 0.25 | 0.25 | 0.25 | 0.25 |
| 1,3-Butylene glycol | 5.00 | 5.00 | 5.00 | 5.00 |
| Panthenol (D-panthenol 75L by DSM) | 0.40 | 0.40 | 0.40 | 0.40 |
| HDI/trimethylol hexyllactone crosspolymer | 5.00 | 5.00 | 3.50 | 5.00 |
| Polyamide-5 | 5.00 | 5.00 | 3.50 | 5.00 |
| White Beeswax BP | 5.18 | 5.18 | 9.32 | 7.77 |
| Carnauba wax | 4.09 | 4.09 | 4.90 | 4.09 |
| Hard paraffin BP | 0 | 0 | 1.50 | 1.50 |
| Candelilla wax | 0 | 4.00 | 3.0 | 2.50 |
| Purified water BP | q.s. 100 | q.s. 100 | q.s. 100 | q.s. 100 |

The mascara formulations above were manufactured using the following method:

1) In a support vessel, the waxes (white beeswax, carnauba wax, hard paraffin and candelilla wax) and the emulsifiers (cetearyl alcohol and steareth-21) were heated to between 80° C. and 85° C. until all of the waxes had melted;
2) In a main vessel, sequestrene tetrasodium was dispersed in water through hand-stirring; 3) PPG-17/IPDI/DMPA copolymer was mixed to the main vessel through hand-stirring until the solution was uniform;
4) Black iron oxide C33-7001 was mixed to the main vessel using a homogeniser at a speed of 4000 rpm until homogenisation was complete;
5) Hydroxyethylcellulose was mixed to the main vessel using a homogeniser at a speed of 4500 rpm until homogenisation was complete;
6) Xanthan gum was mixed to the main vessel using a homogeniser at a speed of 4500 rpm until homogenisation was complete;
7) The preservatives (phenoxetol, ethyl hydroxybenzoate, methyl hydroxybenzonate, capryly glycol and ethylhexylglycerin) and butylene glycol were mixed to the main vessel through hand-stirring until homogenisation was complete;
8) The main vessel was heated to between 80° C. and 85° C. before adding the contents of the support vessel to the main vessel with a homogeniser running at 4500. Continuous homogenising was carried out until the composition was smooth and glossy;
9) HDI/trimethylol hexyllactone crosspolymer and polyamide-5 were mixed to the composition using a homogeniser at a speed of 4500 rpm until the composition was smooth and glossy;
10) The composition was cooled to below 50° C.; and
11) Panthenol was mixed to the composition through hand-stirring until the composition was uniform.

The aliphatic polyurethane resin present in the formulations is PPG-17/IPDI/DMPA copolymer. The waxes present in the formulations above are white beeswax BP, carnauba wax, hard paraffin BP and candelilla wax. Table 2 shows the ratio of total aliphatic polyurethane resin concentration against total wax concentration.

TABLE 2

| Example | Resin:Wax ratio |
|---|---|
| CE1 | 1.353 |
| CE2 | 0.945 |
| CE3 | 0.670 |
| IE | 0.791 |

Example 2—Expert Study

Methodology

Nine women volunteers, who are considered knowledgeable regarding the types of mascara commercially available and how to apply a mascara, were asked to test mascara formulations CE3 and IE. The volunteers were asked to apply three coats of one the mascara formulations, where a re-dip of the mascara brush into the pack in order to reload the applicator was necessary in order to apply the second and third coats. The volunteers were informed that they may carry out as many "sweeps" as they wish, a "sweep" being a stroke of the applicator over the lashes without reloading the applicator. The volunteers were then asked to assess whether the mascara smudged after splashing the face with cold water. The volunteers were then asked to remove the mascara application by applying warm water to the lashes several times for two minutes followed by either (i) wiping off the application with gentle pressure using a cotton make-up remover pad or (ii) by pulling the application off using fingertips.

The volunteers were asked to repeat the above with the other mascara formulation so that each volunteer tested both formulations. The volunteers were then asked to fill in a questionnaire. In particular, each volunteer gave a series of statements a score from 0 to 5 depending on how much they were in agreement with the statement (0 indicates a strong disagreement, 5 indicates a strong agreement).

Results

Table 3 shows the average agreement score in relation to the statements posed for each mascara formulation.

TABLE 3

| | Agreement Score | |
|---|---|---|
| Statement | CE3 | IE |
| Easy to apply | 4.33 | 4.43 |
| Root to tip application | 3.50 | 4.71 |
| Resistance to forming bits and lumps | 3.33 | 4.14 |
| Ability to build | 3.33 | 3.57 |

The results clearly show that CE3 (with a total aliphatic polyurethane resin concentration to total wax concentration ratio of below 0.70) underperforms IE (with a total aliphatic polyurethane resin concentration to total wax concentration ratio of above 0.70). In particular, the volunteers reported an issue with CE3, when removing the mascara, that the mascara did not form tubes but instead formed small clumps. This is not appealing to the consumer, who would be concerned that smaller clumps that more likely to come off during normal use of the mascara compared to a tubing mascara.

Example 3—User Trial Study

Methodology

Thirty one women volunteers aged between 18 and 55 were asked to test mascara formulations CE1, CE2 and IE. All of the volunteers tested in the study were daily mascara users and liked a volumised look. As with Example 2, the volunteers were asked to apply three coats of one the mascara formulations, where a re-dip of the mascara brush into the pack in order to reload the applicator was necessary in order to apply the second and third coats. As above, the volunteers were informed that they may carry out as many "sweeps" as they wish, a "sweep" being a stroke of the applicator over the lashes without reloading the applicator. The volunteers were then asked to wear the mascara application for a minimum of 24 hours and for part of this duration of the application they would need to experience sweating and/or humid conditions in order to fully test the long-wear nature of the mascara formulations. As above, the volunteers were then asked to remove the mascara application by applying warm water to the lashes several times for two minutes followed by either (i) wiping off the application with gentle pressure using a cotton make-up remover pad or (ii) by pulling the application off using fingertips.

The volunteers were asked to repeat the above with the other two mascara formulations so that each volunteer tested all three formulations. The volunteers were then asked to fill in a questionnaire.

Results

Table 4 below shows the percentage of volunteers that answered positively to the statements posed with respect to each mascara formulation.

TABLE 4

| | Percentage Positive Result | | |
|---|---|---|---|
| Statement | CE1 | CE2 | IE |
| This product gave my lashes a false lash effect | *64.11* | *68.42* | 80.56 |
| This product creates dramatic volume | *58.98* | *60.52* | 83.33 |
| This product was sweat proof | 97.22 | 97.22 | 91.18 |
| This product tear proof | 92.59 | 91.67 | 88.00 |
| This product was humidity proof | 100.00 | 97.30 | 91.18 |
| This product was smudge proof | 89.75 | 94.74 | 80.56 |
| After wearing this product for 24 hours, the "ultra volume" that the product gave my lashes was still acceptable | 74.36 | 73.68 | 77.78 |
| The product was easy to remove with warm water | 87.18 | 78.95 | 86.11 |

The skilled person would understand that, in order to make any of the statements as a claim that can be presented on the pack of the product or in marketing materials, at least two thirds of the volunteers have to respond positively to the statement. Any of the statements that did not meet this requirement is presented in italics in Table 4.

The results show that, where the total aliphatic polyurethane resin concentration to total wax concentration ratio was above 0.92 (in CE1 and CE2), claims relating to a false lash effect and dramatic volume could not be made. By contrast, once a total aliphatic polyurethane resin concentration to total wax concentration ratio below 0.92 was achieved (in IE), these claims could then be made.

Decreasing the total aliphatic polyurethane resin concentration to total wax concentration ratio to below 0.92 (in IE) had a slight detrimental effect with respect to the long-wear claims (the mascara being sweat proof, tear proof, humidity proof and smudge proof). However, even when the total aliphatic polyurethane resin concentration to total wax concentration ratio was below 0.92, IE still provided a more than adequate level of long-wear. Thus, the inventive example provides the correct balance between providing dramatic volume and providing longwear.

IE was the most effective in providing "ultra volume" that lasts for at least 24 hours. All of the compositions were easy to remove with warm water.

The invention claimed is:

1. A stable, fluid, tubing mascara composition in the form of an oil-in-water emulsion comprising:
    (i) at least 9% by weight of the total composition of one or more film-forming aliphatic polyurethane resins; and
    (ii) one or more waxes;
    wherein the ratio of total aliphatic polyurethane resin concentration to total wax concentration is between 0.78 and 0.92, and
    wherein paraffin wax forms between 7% and 15% of the total wax.

2. The mascara composition of claim 1, wherein one or more of the film-forming aliphatic polyurethane resins comprises a polyether-polyurethane resin.

3. The mascara composition of claim 1, wherein the total film-forming aliphatic polyurethane resin concentration is at least 10% by weight of the total composition.

4. The mascara composition of claim 1, wherein the one or more waxes further comprise one or more waxes chosen from one or more waxes in the group of petrolatum waxes, microcrystalline waxes, waxes of plant or animal origin, mineral waxes, polyethylene waxes, waxes obtained by the Fischer-Tropsch synthesis, a $C_{20}$-$C_{40}$ alkyl hydroxystearyloxystearate, waxy copolymers, waxes obtained by catalytic hydrogenation of animal or vegetable oils having linear or branched $C_8$-$C_{32}$ fatty chains, waxes obtained by hydrogenation of olive oil esterified with stearyl alcohol, waxes obtained by hydrogenation of castor oil esterified with cetyl alcohol, silicone waxes, and fluoro waxes.

5. The mascara composition of claim 4 wherein the one or more waxes further comprise carnauba wax, candelilla wax, beeswax or combinations thereof.

6. The mascara composition of claim 1 wherein the total wax concentration is at least 14% by weight of the total composition.

7. The mascara composition of claim 1, wherein the composition further comprises one or more emulsifiers.

8. The mascara composition of claim 7, wherein the total emulsifier concentration is less than 6%, by weight of the total composition.

9. The mascara composition of claim 1, wherein the mascara composition further comprises one or more volumising powders or fillers.

10. The mascara composition of claim 9, wherein the total volumising powder/filler concentration is between 2% and 20%, by weight of the total composition.

11. The mascara composition of claim 1, wherein the ratio of total aliphatic polyurethane resin concentration to total wax concentration is between 0.79 and 0.92.

12. The mascara composition of claim 1, wherein the mascara composition further comprises a water-soluble polymer.

13. The mascara composition of claim 2, wherein the polyether-polyurethane resin comprises a PPG-17/IPDI/DMPA copolymer.

14. The mascara composition of claim 9, wherein the volumising powders or fillers are chosen from one or more volumising powders or fillers in the group of HDI/trimethylol hexyllactone crosspolymer, polyamide powders, nylon powders, rayon, silica, treated silica, zinc stearate, mica, kaolin, polyethylene powder, PTFE powders, starch, boron nitride, copolymer microspheres, silicone resin microbeads, talc, mica, synthetic fluorphlogopite and combinations thereof.

15. The mascara composition of claim 9, wherein the total volumising powder/filler concentration is between 8% and 12%, by weight of the total composition.

16. The mascara composition of claim 1, wherein the ratio of total aliphatic polyurethane resin concentration to total wax concentration is between 0.78 and 0.82.

17. The mascara composition of claim 12, wherein the water-soluble polymer is chosen from one or more water-soluble polymers in the group of gums, dextrin, starch, proteins, hydroxyethylcellulose, methylcellulose, ethylcellulose, carboxymethyl cellulose, methyl starch, carboxymethyl starch, soluble starch, polyvinyl alcohol, polyvinylmethylether, sodium polyacrylate, polyacrylate crosspolymer, polyacrylic acid, bentonite, laponite, non-dispersed silicon, and magnesium aluminium silicate.

* * * * *